(12) United States Patent
Yuan et al.

(10) Patent No.: US 12,543,186 B2
(45) Date of Patent: Feb. 3, 2026

(54) PROCESSING OF TWO-STAGE DOWNLINK CONTROL INFORMATION

(71) Applicant: QUALCOMM Incorporated, San Diego, CA (US)

(72) Inventors: Fang Yuan, Beijing (CN); Yu Zhang, San Diego, CA (US); Chao Wei, Beijing (CN); Hao Xu, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 18/002,141

(22) PCT Filed: Jun. 17, 2020

(86) PCT No.: PCT/CN2020/096490
§ 371 (c)(1),
(2) Date: Dec. 16, 2022

(87) PCT Pub. No.: WO2021/253262
PCT Pub. Date: Dec. 23, 2021

(65) Prior Publication Data
US 2023/0171786 A1  Jun. 1, 2023

(51) Int. Cl.
*H04W 72/23* (2023.01)
*H04W 72/12* (2023.01)

(52) U.S. Cl.
CPC .......... *H04W 72/23* (2023.01); *H04W 72/12* (2013.01)

(58) Field of Classification Search
CPC .............................. H04W 72/23; H04W 72/12
See application file for complete search history.

(56) References Cited

U.S. PATENT DOCUMENTS

| | | | |
|---|---|---|---|
| 2019/0007959 A1 | 1/2019 | Hwang et al. | |
| 2020/0229098 A1* | 7/2020 | Cheng | H04W 52/0248 |
| 2020/0288479 A1* | 9/2020 | Xi | H04L 5/0092 |
| 2020/0359407 A1* | 11/2020 | Takeda | H04W 72/23 |

FOREIGN PATENT DOCUMENTS

| | | |
|---|---|---|
| CN | 106162907 A | 11/2016 |
| CN | 110366250 A | 10/2019 |
| CN | 110971361 A | 4/2020 |
| EP | 3740014 A1 | 11/2020 |

(Continued)

OTHER PUBLICATIONS

Supplementary European Search Report—EP20941416—Search Authority—Munich—Feb. 14, 2024.

(Continued)

*Primary Examiner* — Jackie Zuniga Abad
(74) *Attorney, Agent, or Firm* — Paul M. McAdams; Harrity & Harrity, LLP (57) ABSTRACT

Various aspects of the present disclosure generally relate to wireless communication. In some aspects, a user equipment (UE) may receive first downlink control information (DCI) and second DCI that together schedule a communication of the UE, where the second DCI is received using a default beam or according to a minimum scheduling offset. The UE may transmit or receive the communication based at least in part on the first DCI and the second DCI. Numerous other aspects are provided.

30 Claims, 7 Drawing Sheets

(56) References Cited

FOREIGN PATENT DOCUMENTS

| WO | WO-2014049169 A1 | 4/2014 | |
|---|---|---|---|
| WO | WO-2019099659 A1 | 5/2019 | |
| WO | 2019130571 A1 | 7/2019 | |
| WO | WO-2019138499 A1 | 7/2019 | |
| WO | WO-2020063334 A1 * | 4/2020 | ........... H04L 5/0053 |

OTHER PUBLICATIONS

International Search Report and Written Opinion—PCT/CN2020/096490—ISA/EPO—Mar. 18, 2021.

* cited by examiner

PROCESSING OF TWO-STAGE DOWNLINK CONTROL INFORMATION

CROSS-REFERENCE TO RELATED APPLICATION

This Patent Application is a 371 national stage of PCT Application No. PCT/CN2020/096490 filed on Jun. 17, 2020, entitled "PROCESSING OF TWO-STAGE DOWNLINK CONTROL INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for processing of two-stage downlink control information (DCI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving first downlink control information (DCI) and second DCI that together schedule a communication of the UE, wherein the second DCI is received using a default beam or according to a minimum scheduling offset; and transmitting or receiving the communication based at least in part on the first DCI and the second DCI.

In some aspects, a method of wireless communication, performed by a base station, may include transmitting first DCI and second DCI that together schedule a communication of a UE, wherein the second DCI is transmitted using a default beam or according to a minimum scheduling offset; and transmitting or receiving the communication based at least in part on the first DCI and the second DCI.

In some aspects, a UE for wireless communication may include a memory and one or more processors operatively coupled to the memory. The memory and the one or more processors may be configured to receive first DCI and second DCI that together schedule a communication of the UE, wherein the second DCI is received using a default beam or according to a minimum scheduling offset; and transmit or receive the communication based at least in part on the first DCI and the second DCI.

In some aspects, a base station for wireless communication may include a memory and one or more processors operatively coupled to the memory. The memory and the one or more processors may be configured to transmit first DCI and second DCI that together schedule a communication of a UE, wherein the second DCI is transmitted using a default beam or according to a minimum scheduling offset; and transmit or receive the communication based at least in part on the first DCI and the second DCI.

In some aspects, a non-transitory computer-readable medium may store one or more instructions for wireless communication. The one or more instructions, when executed by one or more processors of a UE, may cause the one or more processors to receive first DCI and second DCI that together schedule a communication of the UE, wherein the second DCI is received using a default beam or according to a minimum scheduling offset; and transmit or receive the communication based at least in part on the first DCI and the second DCI.

In some aspects, a non-transitory computer-readable medium may store one or more instructions for wireless communication. The one or more instructions, when executed by one or more processors of a base station, may cause the one or more processors to transmit first DCI and second DCI that together schedule a communication of a UE, wherein the second DCI is transmitted using a default beam or according to a minimum scheduling offset; and transmit or receive the communication based at least in part on the first DCI and the second DCI.

In some aspects, an apparatus for wireless communication may include means for receiving first DCI and second DCI that together schedule a communication of the apparatus, wherein the second DCI is received using a default beam or according to a minimum scheduling offset; and means for transmitting or receiving the communication based at least in part on the first DCI and the second DCI.

In some aspects, an apparatus for wireless communication may include means for transmitting first DCI and second DCI that together schedule a communication of a UE, wherein the second DCI is transmitted using a default beam or according to a minimum scheduling offset; and means for transmitting or receiving the communication based at least in part on the first DCI and the second DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
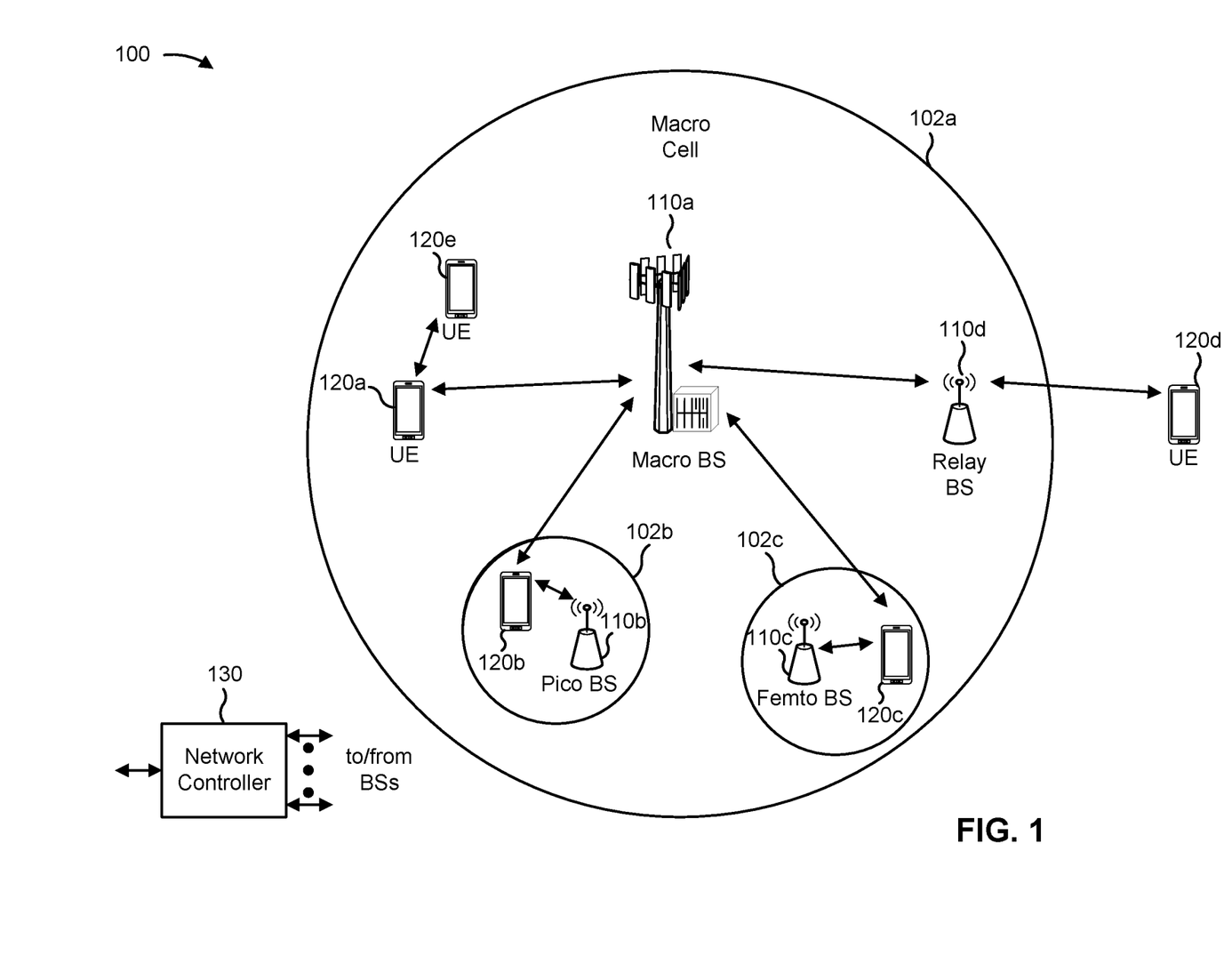
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
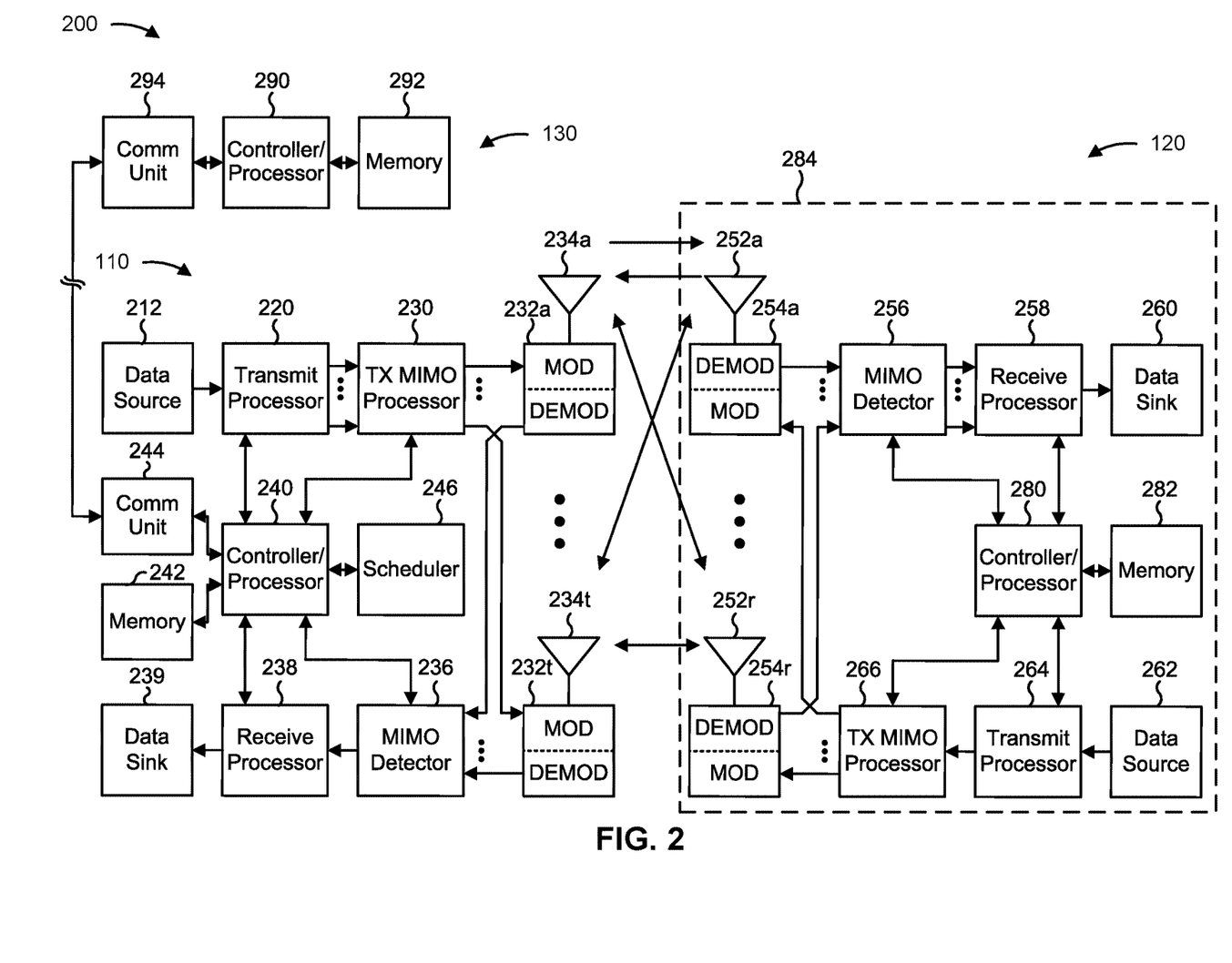
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4A, 4B, 5, and 6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4A, 4B, 5, and 6.

Controller/processor 240 of base station 110, controller/processor 280 of UE 120, and/or any other component(s) of FIG. 2 may perform one or more techniques associated with processing of two-stage downlink control information (DCI), as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like.

In some aspects, UE 120 may include means for receiving first DCI and second DCI that together schedule a communication of the UE 120, where the second DCI is received using a default beam or according to a minimum scheduling offset, means for transmitting or receiving the communication based at least in part on the first DCI and the second DCI, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting first DCI and second DCI that together schedule a communication of a UE, where the second DCI is transmitted using a default beam or according to a minimum scheduling offset, means for transmitting or receiving the communication based at least in part on the first DCI and the second DCI, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
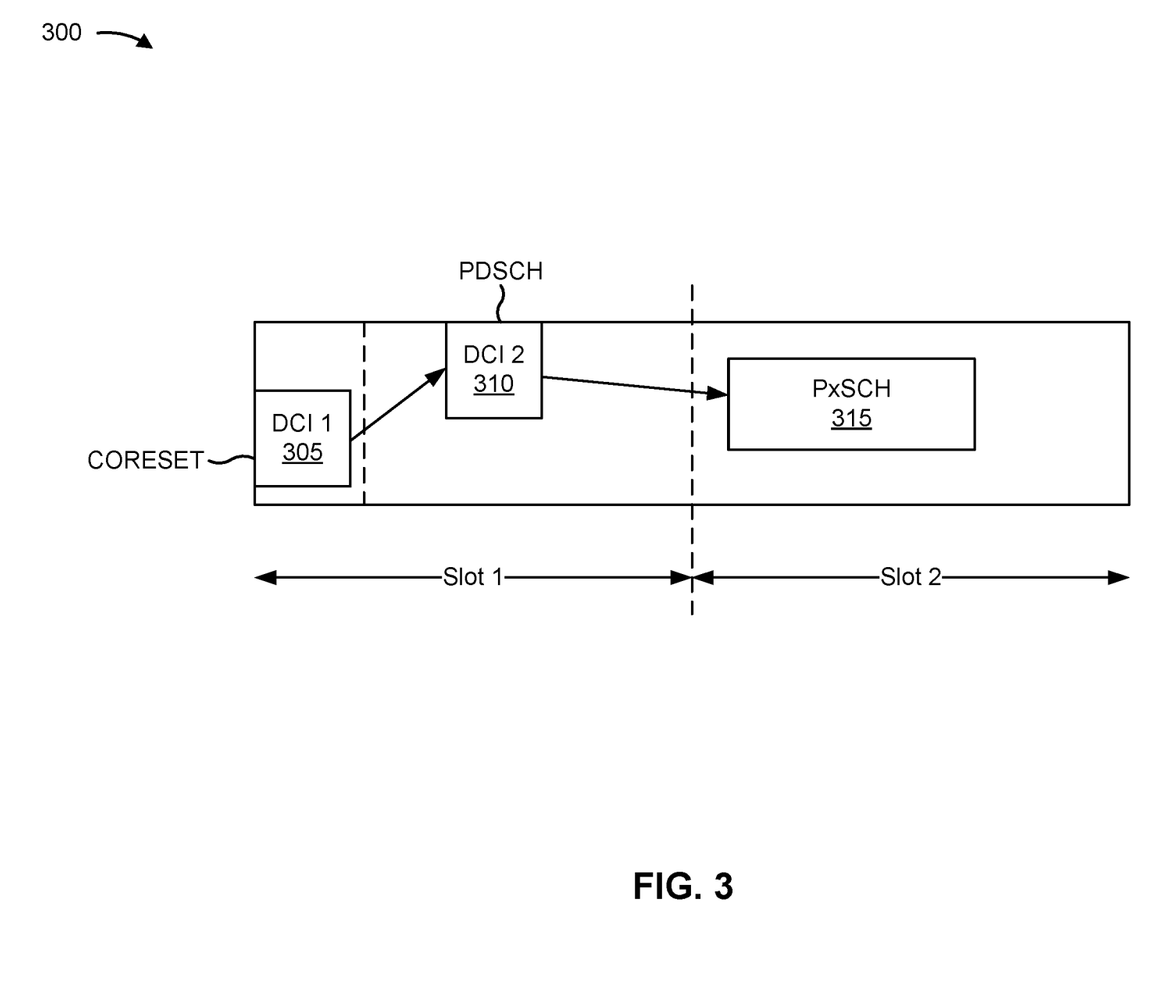
FIG. 3 is a diagram illustrating an example of two-stage DCI, in accordance with various aspects of the present disclosure.

FIG. 3 is a diagram illustrating an example 300 of two-stage DCI, in accordance with various aspects of the present disclosure. As shown in FIG. 3, two-stage DCI may be used to schedule a physical downlink shared channel (PDSCH) communication or physical uplink shared channel (PUSCH) communication of a UE. A PDSCH communication or a PUSCH communication may be referred to herein as a PxSCH communication.

As shown in FIG. 3, a first DCI 305 (DCI 1) and a second DCI 310 (DCI 2) may together schedule a PxSCH communication 315 of a UE. The UE may receive the first DCI 305 (e.g., a first stage of the two-stage DCI) in a physical downlink control channel (PDCCH) in a control resource set (CORESET). The UE may receive the first DCI 305 in a first slot (Slot 1). The first DCI 305 may include scheduling information (e.g., time and frequency information, beam information, and/or the like) for the PxSCH communication 315 and/or include scheduling information for the second DCI 310.

The UE may receive the second DCI 310 (e.g., a second stage of the two-stage DCI) in a PDSCH (e.g., according to the scheduling information for the second DCI 310 in the first DCI 305). The UE may receive the second DCI 310 in the first slot (e.g., in the same slot as the first DCI 305). The second DCI 310 also may include scheduling information for the PxSCH communication 315.

Accordingly, the scheduling information of the first DCI 305 and the scheduling information of the second DCI 310 may together identify scheduling for the PxSCH communication 315. The PxSCH communication 315 may be scheduled in a second slot (Slot 2). That is, the PxSCH communication 315 may be scheduled in a different slot than the slot in which the first DCI 305 and the second DCI 310 are received. Although the example 300 shows that the PxSCH communication 315 is scheduled in the second slot, a time location of the PxSCH communication 315 may be in another slot, such as the first slot (Slot 1).

Wireless networks generally lack support for techniques to process, schedule, or otherwise enable two-stage DCI. In particular, a UE may not be enabled to determine a default beam for receiving second DCI of two-stage DCI, to receive the second DCI according to a minimum scheduling offset, to determine a timeline for processing a PUSCH scheduled by the two-stage DCI, and/or the like. This may increase the complexity associated with processing the two-stage DCI at the UE.

Some techniques and apparatuses described herein enable processing of two-stage DCI. In some aspects, a UE may receive second DCI of two-stage DCI using a default beam or according to a minimum scheduling offset. In some aspects, the UE may process a PUSCH scheduled by two-stage DCI according to a processing timeline. In this way, two-stage DCI may be processed at the UE with reduced complexity, thereby conserving computing resources, memory resources, and/or the like.

As indicated above, FIG. 3 is provided as an example. Other examples may differ from what is described with respect to FIG. 3.

Figure 4A:
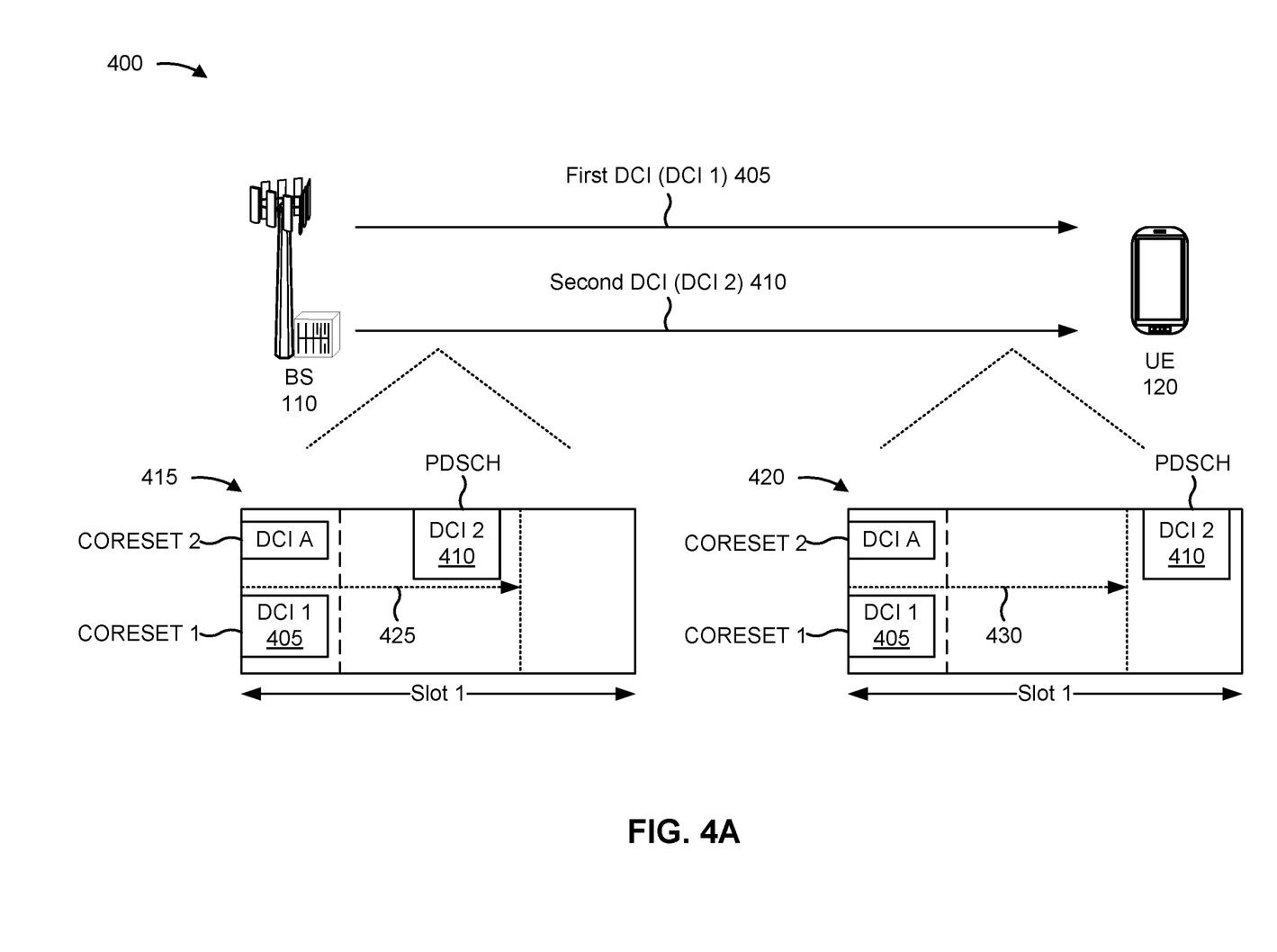
FIGS. 4A and 4B are diagrams illustrating one or more examples associated with processing of two-stage DCI, in accordance with various aspects of the present disclosure.
Figure 4B:
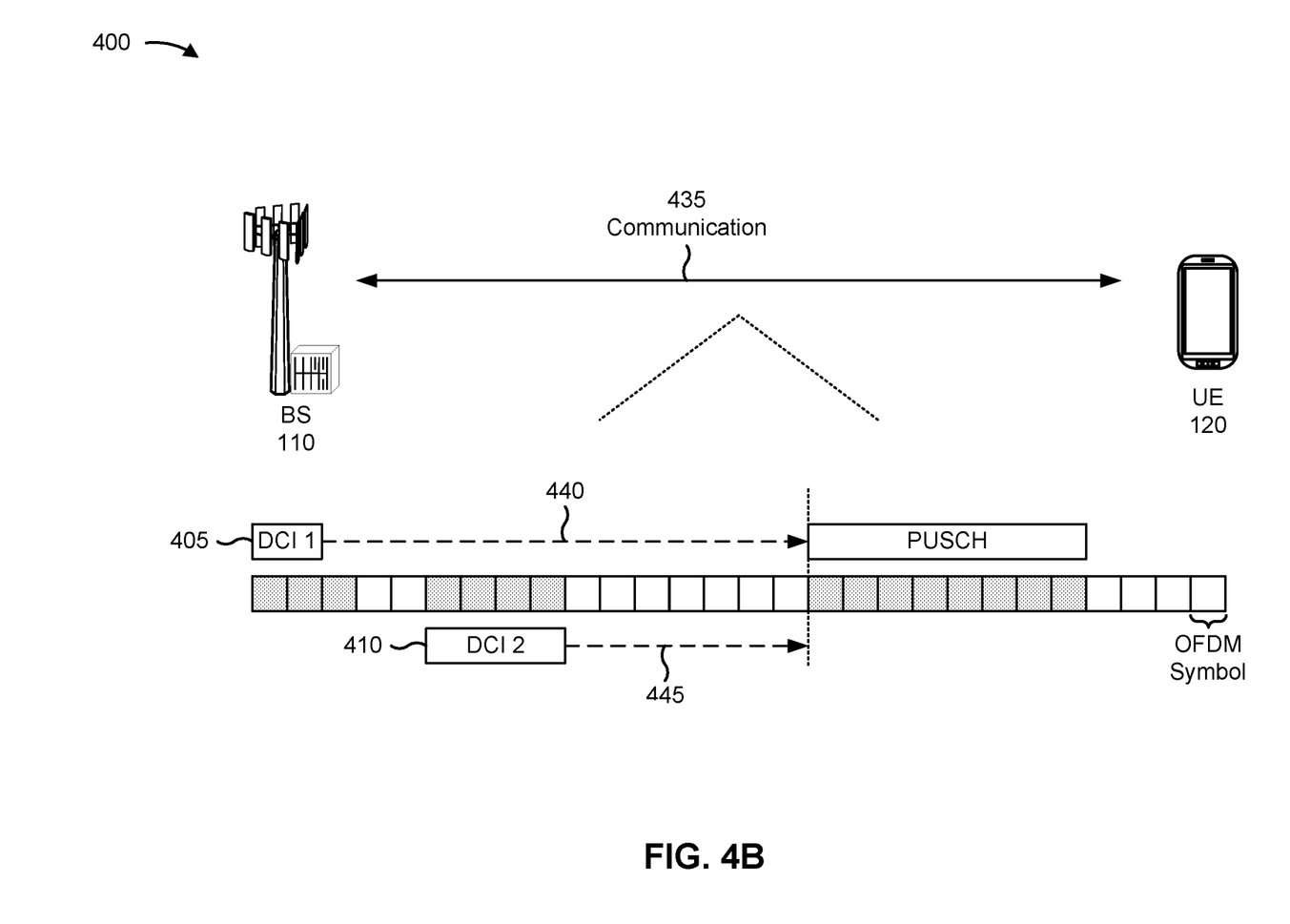

FIGS. 4A and 4B are diagrams illustrating one or more examples 400 associated with processing of two-stage DCI, in accordance with various aspects of the present disclosure. As shown in FIGS. 4A and 4B, example 400 includes a base station 110 and a UE 120. Although example 400 shows the UE 120 receiving two-stage DCI from a single base station 110, in some aspects, the UE 120 may receive the first and second stages of the two-stage DCI from different base stations 110, different TRPs (e.g., co-located at the same base station 110 or located at different base stations 110), and/or the like.

As shown in FIG. 4A, the base station 110 may transmit, and the UE 120 may receive, first DCI (DCI 1) 405 of two-stage DCI. The UE 120 may receive the first DCI 405 in a PDCCH in a CORESET, as described above. As further shown in FIG. 4A, the base station 110 may transmit, and the UE 120 may receive, second DCI (DCI 2) 410 of the two-stage DCI. The UE 120 may receive the second DCI 410 in a PDSCH, as described above. In some aspects, the first DCI 405 may include scheduling for the second DCI 410. In some aspects, the first DCI 405 may schedule the second DCI 410 with a cell radio network temporary identifier (C-RNTI), a configured scheduling RNTI (CS-RNTI), an MCS cell RNTI (MCS-C-RNTI), and/or the like.

The first DCI 405 and the second DCI 410 may each include scheduling information for a communication (e.g., a PxSCH communication) of the UE 120. That is, the first DCI 405 and the second DCI 410 may together schedule the communication. The UE 120 may receive the second DCI 410 using a default beam, as illustrated by reference number 415, or according to a minimum scheduling offset as illustrated by reference number 420. The default beam may be associated with a transmission configuration indicator (TCI) or a quasi co-location (QCL) assumption (e.g., a QCL type D assumption) associated with a reference signal, such as synchronization signal block (SSB), a channel state information reference signal (CSI-RS), a sounding reference signal (SRS), and/or the like.

As shown by reference number 415, the UE 120 may use the default beam to receive the second DCI 410 when a time offset between receiving the first DCI 405 and receiving the second DCI 410 is less than a threshold time duration 425 (e.g., timeDurationForQCL, as defined in the 3GPP specification). In other words, the UE 120 may use the default beam to receive the second DCI 410 during the threshold time duration 425 after receiving the first DCI 405. Accordingly, the UE 120 may buffer the first DCI 405 for subsequent decoding after the second DCI 410 is received. In some aspects, the UE 120 may use the default beam to receive the second DCI 410 in a case where TCI identification in DCI is enabled (e.g., tci-PresentInDCI is enabled), or in a case where TCI identification in DCI is not configured (e.g., tci-PresentinDCI is not configured) in radio resource control (RRC) connected mode.

In some aspects, the UE 120 may determine the default beam that is to be used to receive the second DCI 410. For example, the UE 120 may determine the default beam based at least in part on a QCL assumption associated with a CORESET, such as a CORESET associated with a lowest CORESET identifier (ID) of CORESETs associated with search spaces monitored by the UE 120 (e.g., in an active bandwidth part (BWP) for the UE 120) in the current slot (e.g., the slot in which the first DCI 405 is received). As an example, the UE 120 may assume that demodulation reference signal (DM-RS) ports of the PDSCH occasion carrying the second DCI 410 are quasi co-located with one or more reference signals (RSs) used for PDCCH QCL indication for a CORESET (e.g., a CORESET associated with a monitored search space) associated with a lowest CORESET ID in the current slot.

As shown by reference number 415, in the current slot (Slot 1), the UE 120 may monitor a search space associated with a first CORESET (CORESET 1) that includes the first DCI 405, and monitor a search space associated with a second CORESET (CORESET 2) that includes another DCI (DCI A). Moreover, the first CORESET may be associated with a first TCI state and the second CORESET may be associated with a second TCI state. In this example, the UE 120 may determine that the default beam for receiving the second DCI 410 is associated with the first TCI state because the first CORESET (CORESET 1) has the lowest CORESET ID among the first CORESET and the second CORESET (CORESET 2).

In this way, for both the cases when tci-PresentInDCI is set to "enabled" and tci-PresentInDCI is not configured in RRC connected mode, if the offset between the reception of the first DCI and second DCI on a PDSCH occasion is less than the threshold timeDurationForQCL, the UE may assume that the DM-RS ports of the PDSCH occasion carrying the second DCI of a serving cell are quasi co-located with the RS(s) with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE.

As shown by reference number 420, the UE 120 may receive the second DCI 410 (e.g., using a C-RNTI, CS-RNTI, or MCS-C-RNTI) according to a minimum scheduling offset 430 (e.g., as an alternative to using the default beam). The minimum scheduling offset 430 may be a time offset between reception of the first DCI 405 and reception of the second DCI 410. In some aspects, the UE 120 may receive the second DCI 410 according to the minimum scheduling offset 430 when the minimum scheduling offset 430 is configured (e.g., RRC configured) for the UE 120, or otherwise indicated for the UE 120. As an example, if the minimum scheduling offset 430 is configured for the UE 120, then the UE 120 may determine that the second DCI 410 is not to be received until after the minimum scheduling offset 430 following reception of the first DCI 405.

In this way, the UE 120 has sufficient time to decode the first DCI 405 in order to determine scheduling information for receiving the second DCI 410. Accordingly, the first DCI 405 may schedule the second DCI 410 using a timing value (e.g., a timing value indicating a timing between a downlink grant included in the first DCI 405 and reception of a corresponding downlink data communication (e.g., the second DCI 410), which may be referred to as a $K_0$ value) that satisfies (e.g., is greater than or equal to) the minimum scheduling offset 430 (which may be referred to as $K_{0min}$).

In this way, when the minimum scheduling offset restriction is applied, the UE is not expected to be scheduled with a first DCI in slot n and a second DCI on a PDSCH scheduled with C-RNTI, CS-RNTI or MCS-C-RNTI with $K_0$ smaller than the applicable minimum scheduling offset restriction $K_{0min}$. In some aspects, $K_{0min}$ and/or $K_0$ may be associated with a time granularity of a slot, an OFDM symbol duration that is determined by a subcarrier spacing, or another time unit.

As described above, the first DCI 405 and the second DCI 410 may each include scheduling information for the communication (e.g., the PxSCH communication) of the UE 120. Accordingly, the UE 120 may decode and combine the scheduling information of the first DCI 405 and the second DCI 410 in order to determine scheduling for the communication.

As shown in FIG. 4B, and by reference number 435, the UE 120 may transmit or receive the communication (e.g., a transport block) scheduled by the first DCI 405 and the second DCI 410. For example, the UE 120 may receive, from the base station 110, the communication in a PDSCH scheduled by the first DCI 405 and the second DCI 410.

As another example, the UE 120 may transmit, to the base station 110, the communication in a PUSCH scheduled by the first DCI 405 and the second DCI 410. In this case, the first DCI 405 and the second DCI 410 may schedule the communication after a PUSCH processing time (e.g., a single timeline constraint). In particular, the first DCI 405 and the second DCI 410 may indicate a slot offset (e.g., a timing value indicating a timing between an uplink grant indicated by the first DCI 405 and the second DCI 410 and transmission of a corresponding uplink data communication (e.g., the communication), which may be referred to as a K2 value) and a start and length indicator value (SLIV) for the communication, and the communication may be associated with a timing advance. Accordingly, the first DCI 405 and the second DCI 410 may schedule the communication (e.g., including one or more DM-RSs for the communication) to be transmitted (e.g., according to the slot offset, SLIV, and/or timing advance) starting in a symbol that is after a symbol (which may be referred to as symbol L2) associated with a PUSCH processing time.

In some aspects, as shown by reference number 440, a processing time (Tproc2) may be from reception of the last symbol of the PDCCH (e.g., the end of the PDCCH) carrying the first DCI 405. Accordingly, the communication may be scheduled to be transmitted starting in a symbol that is after the processing time measured from the end of the PDCCH (e.g., L2>Tproc2). In some aspects, as shown by reference number 445, a processing time (Tproc2') may be from reception of the last symbol of the PDSCH (e.g., the end of the PDSCH) carrying the second DCI 410. Accordingly, the communication may be scheduled to be transmitted starting in a symbol that is after the processing time measured from the end of the PDSCH (e.g., L2>Tproc2').

In this way, the UE may transmit the transport block in PUSCH, if the first uplink symbol in the PUSCH allocation for a transport block, including the DM-RS, as defined by the slot offset K2 and the start and length indicator SLIV of the scheduling two-stage DCI and including the effect of the timing advance, starts no earlier than at symbol L2, where L2 is defined as the next uplink symbol with its cyclic prefix (CP) starting after the end of the reception of the last symbol of the PDCCH carrying the first DCI scheduling the PUSCH, or the PDSCH carrying the second DCI scheduling the PUSCH.

In some aspects, the first DCI 405 and the second DCI 410 may schedule the communication after a first PUSCH processing time and a second PUSCH processing time (e.g., two timeline constraints). Accordingly, the first DCI 405 and the second DCI 410 may schedule the communication (e.g., including one or more DM-RSs for the communication) to be transmitted (e.g., according to the slot offset, SLIV, and/or timing advance) starting in a symbol that is after a symbol (L2) associated with a first PUSCH processing time and after a symbol (which may be referred to as symbol L1) associated with a second PUSCH processing time.

In some aspects, as shown by reference number 440, a first processing time (Tproc2) may be from the last symbol of the PDCCH carrying the first DCI 405. Accordingly, the communication may be scheduled to be transmitted starting in a symbol that is after the first processing time measured from the end of the PDCCH (e.g., L2>Tproc2). In some aspects, as shown by reference number 445, a second processing time (Tproc1) may be from reception of the last symbol of the PDSCH carrying the second DCI 410. Accordingly, the communication also may be scheduled to be transmitted starting in a symbol that is after the second processing time measured from the end of the PDSCH (e.g., L1>Tproc1).

In this way, the UE may transmit the transport block in PUSCH, if the first uplink symbol in the PUSCH allocation for a transport block, including the DM-RS, as defined by the slot offset K2 and the start and length indicator SLIV of the scheduling two-stage DCI and including the effect of the timing advance, starts no earlier than at symbol L2, where L2 is defined as the next uplink symbol with its CP starting after the end of the reception of the last symbol of the PDCCH carrying the first DCI scheduling the PUSCH, and starts no earlier than at symbol L1, where L1 is defined as the next uplink symbol with its CP starting after the end of the last symbol of the PDSCH carrying the second DCI scheduling the PUSCH.

As indicated above, FIGS. 4A and 4B are provided as one or more examples. Other examples may differ from what is described with respect to FIGS. 4A and 4B.

Figure 5:
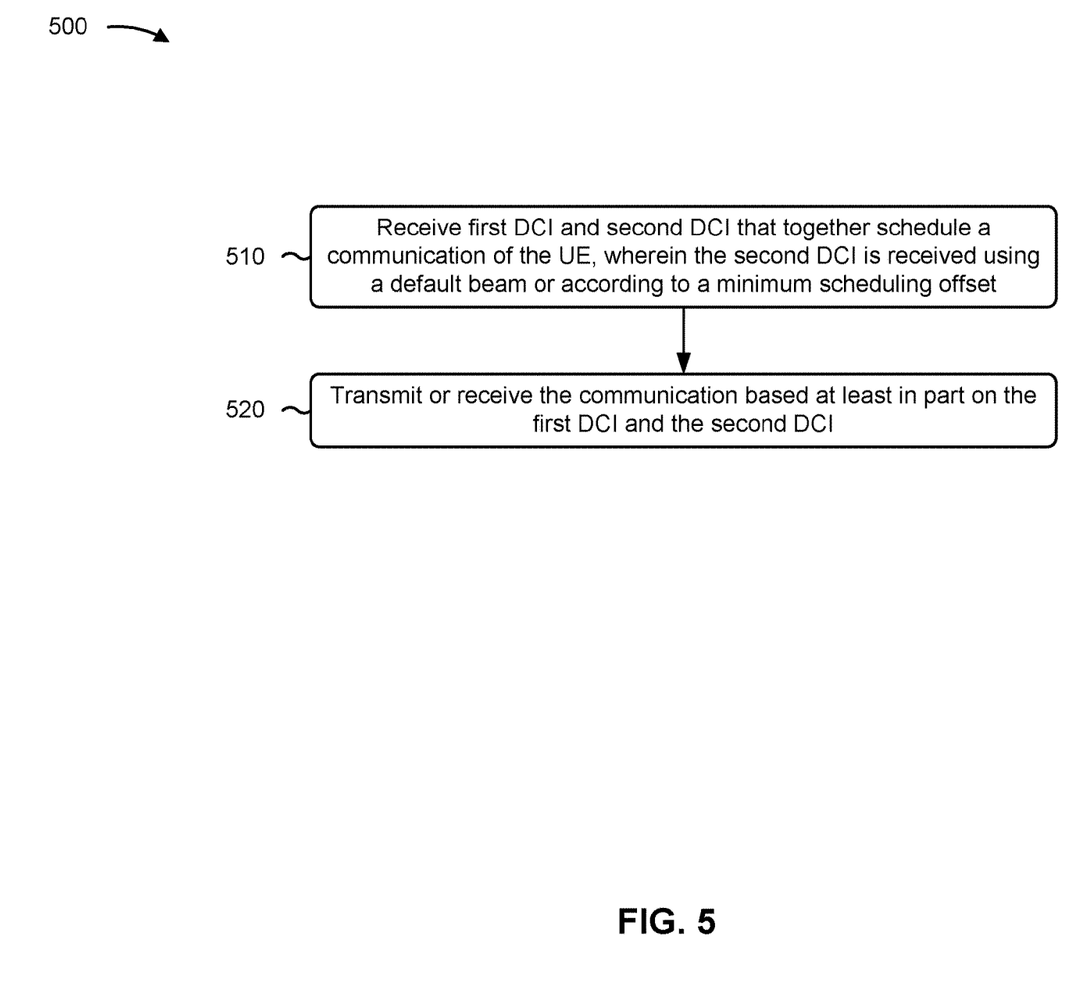
FIGS. 5 and 6 are diagrams illustrating example processes associated with processing of two-stage DCI, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with processing of two-stage DCI.

As shown in FIG. 5, in some aspects, process 500 may include receiving first DCI and second DCI that together schedule a communication of the UE, wherein the second DCI is received using a default beam or according to a minimum scheduling offset (block 510). For example, the UE (e.g., using antenna 252, DEMOD 254, MIMO detector 256, receive processor 258, controller/processor 280, and/or the like) may receive first DCI and second DCI that together schedule a communication of the UE, as described above. In some aspects, the second DCI is received using a default beam or according to a minimum scheduling offset.

As further shown in FIG. 5, in some aspects, process 500 may include transmitting or receiving the communication based at least in part on the first DCI and the second DCI (block 520). For example, the UE (e.g., using antenna 252, DEMOD 254, MIMO detector 256, receive processor 258, controller/processor 280, transmit processor 264, TX MIMO processor 266, MOD 254, and/or the like) may transmit or receive the communication based at least in part on the first DCI and the second DCI, as described above.

Process 500 may include additional aspects, such as any single aspect or any combination of aspects described below and/or in connection with one or more other processes described elsewhere herein.

In a first aspect, the second DCI is received in a PDSCH.

In a second aspect, alone or in combination with the first aspect, the second DCI is received using the default beam when a time offset between receiving the first DCI and receiving the second DCI does not satisfy a threshold value.

In a third aspect, alone or in combination with one or more of the first and second aspects, process 500 includes determining the default beam based at least in part on a QCL assumption associated with a CORESET.

In a fourth aspect, alone or in combination with one or more of the first through third aspects, the CORESET is associated with a lowest CORESET identifier of CORESETs associated with search spaces monitored by the UE.

In a fifth aspect, alone or in combination with one or more of the first through fourth aspects, the second DCI is received according to the minimum scheduling offset when the minimum scheduling offset is configured for the UE.

In a sixth aspect, alone or in combination with one or more of the first through fifth aspects, process 500 includes determining that the second DCI is to be received after the minimum scheduling offset following reception of the first DCI.

In a seventh aspect, alone or in combination with one or more of the first through sixth aspects, the first DCI schedules the second DCI with a timing value that satisfies the minimum scheduling offset.

In an eighth aspect, alone or in combination with one or more of the first through seventh aspects, the communication is transmitted after a processing time from an end of the first DCI.

In a ninth aspect, alone or in combination with one or more of the first through eighth aspects, the communication is transmitted after a processing time from an end of the second DCI.

In a tenth aspect, alone or in combination with one or more of the first through ninth aspects, the communication is transmitted after a first processing time from an end of the first DCI, and after a second processing time from an end of the second DCI.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
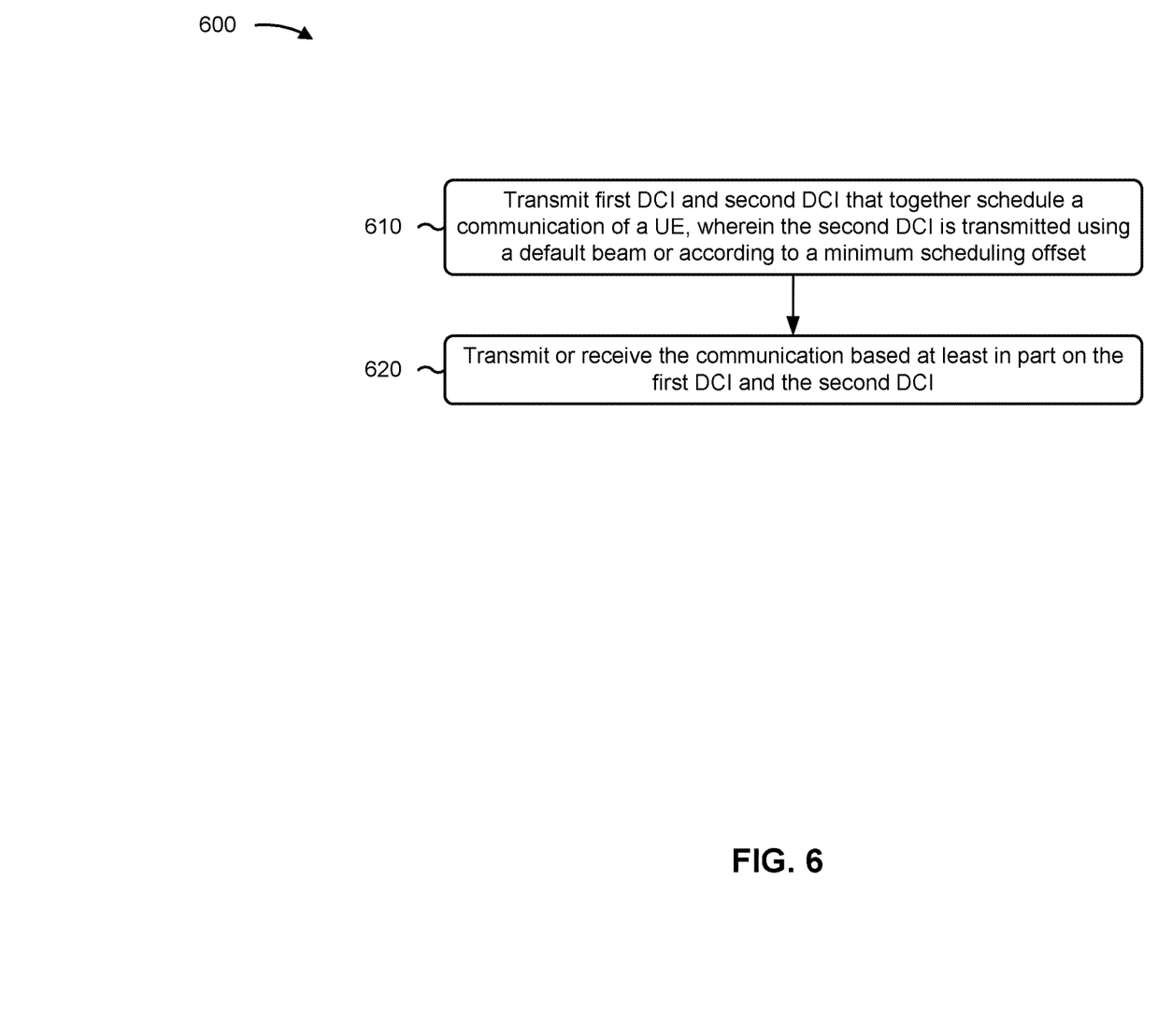

FIG. 6 is a diagram illustrating an example process 600 performed, for example, by a base station, in accordance with various aspects of the present disclosure. Example process 600 is an example where the base station (e.g., base station 110 and/or the like) performs operations associated with processing of two-stage DCI.

As shown in FIG. 6, in some aspects, process 600 may include transmitting first DCI and second DCI that together schedule a communication of a UE, wherein the second DCI is transmitted using a default beam or according to a minimum scheduling offset (block 610). For example, the base station (e.g., using controller/processor 240, transmit processor 220, TX MIMO processor 230, MOD 232, antenna 234, and/or the like) may transmit first DCI and second DCI that together schedule a communication of a UE, as described above. In some aspects, the second DCI is transmitted using a default beam or according to a minimum scheduling offset.

As further shown in FIG. 6, in some aspects, process 600 may include transmitting or receiving the communication based at least in part on the first DCI and the second DCI (block 620). For example, the base station (e.g., using controller/processor 240, transmit processor 220, TX MIMO processor 230, MOD 232, antenna 234, DEMOD 232, MIMO detector 236, receive processor 238, and/or the like) may transmit or receive the communication based at least in part on the first DCI and the second DCI, as described above.

Process 600 may include additional aspects, such as any single aspect or any combination of aspects described below and/or in connection with one or more other processes described elsewhere herein.

In a first aspect, the second DCI is transmitted in a PDSCH.

In a second aspect, alone or in combination with the first aspect, the second DCI is transmitted using the default beam when a time offset between transmitting the first DCI and transmitting the second DCI does not satisfy a threshold value.

In a third aspect, alone or in combination with one or more of the first and second aspects, process 600 includes determining the default beam based at least in part on a QCL assumption, associated with a CORESET, that is to be used by the UE.

In a fourth aspect, alone or in combination with one or more of the first through third aspects, the CORESET is associated with a lowest CORESET identifier of CORESETs associated with search spaces monitored by the UE.

In a fifth aspect, alone or in combination with one or more of the first through fourth aspects, the second DCI is transmitted according to the minimum scheduling offset when the minimum scheduling offset is configured for the UE.

In a sixth aspect, alone or in combination with one or more of the first through fifth aspects, process 600 includes determining that the second DCI is to be transmitted after the minimum scheduling offset following transmission of the first DCI.

In a seventh aspect, alone or in combination with one or more of the first through sixth aspects, the first DCI schedules the second DCI with a timing value that satisfies the minimum scheduling offset.

In an eighth aspect, alone or in combination with one or more of the first through seventh aspects, the communication is received after a processing time from an end of the first DCI.

In a ninth aspect, alone or in combination with one or more of the first through eighth aspects, the communication is received after a processing time from an end of the second DCI.

In a tenth aspect, alone or in combination with one or more of the first through ninth aspects, the communication is received after a first processing time from an end of the first DCI, and after a second processing time from an end of the second DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving first downlink control information (DCI) and second DCI that together schedule a communication of the UE,
   wherein the second DCI is received using a default beam when a time offset between receiving the first DCI and receiving the second DCI is less than a minimum scheduling offset, and
   wherein the second DCI is received according to scheduling information in the first DCI when the time offset is greater than or equal to the minimum scheduling offset; and
   transmitting or receiving the communication based at least in part on the first DCI and the second DCI.

2. The method of claim 1, wherein the second DCI is received in a physical downlink shared channel.

3. The method of claim 1, further comprising:
   determining the default beam based at least in part on a quasi co-location assumption associated with a control resource set (CORESET).

4. The method of claim 3, wherein the CORESET is associated with a lowest CORESET identifier of CORESETs associated with search spaces monitored by the UE.

5. The method of claim 1, wherein the second DCI is received according to the minimum scheduling offset when the minimum scheduling offset is configured for the UE.

6. The method of claim 1, further comprising:
determining that the second DCI is to be received after the minimum scheduling offset following reception of the first DCI.

7. The method of claim 1, wherein the first DCI schedules the second DCI with a timing value that satisfies the minimum scheduling offset.

8. The method of claim 1, wherein the communication is transmitted after a processing time from an end of the first DCI.

9. The method of claim 1, wherein the communication is transmitted after a processing time from an end of the second DCI.

10. The method of claim 1, wherein the communication is transmitted after a first processing time from an end of the first DCI, and after a second processing time from an end of the second DCI.

11. A method of wireless communication performed by a base station, comprising:
transmitting first downlink control information (DCI) and second DCI that together schedule a communication of a user equipment (UE),
wherein the second DCI is transmitted using a default beam when a time offset between transmitting the first DCI and transmitting the second DCI is less than a minimum scheduling offset, and
wherein the second DCI is transmitted according to scheduling information in the first DCI when the time offset is greater than or equal to the minimum scheduling offset; and
transmitting or receiving the communication based at least in part on the first DCI and the second DCI.

12. The method of claim 11, wherein the second DCI is transmitted in a physical downlink shared channel.

13. The method of claim 11, further comprising:
determining the default beam based at least in part on a quasi co-location assumption, associated with a control resource set (CORESET), that is to be used by the UE.

14. The method of claim 13, wherein the CORESET is associated with a lowest CORESET identifier of CORESETs associated with search spaces monitored by the UE.

15. The method of claim 11, wherein the second DCI is transmitted according to the minimum scheduling offset when the minimum scheduling offset is configured for the UE.

16. The method of claim 11, further comprising:
determining that the second DCI is to be transmitted after the minimum scheduling offset following transmission of the first DCI.

17. The method of claim 11, wherein the first DCI schedules the second DCI with a timing value that satisfies the minimum scheduling offset.

18. The method of claim 11, wherein the communication is received after a processing time from an end of the first DCI.

19. The method of claim 11, wherein the communication is received after a processing time from an end of the second DCI.

20. The method of claim 11, wherein the communication is received after a first processing time from an end of the first DCI, and after a second processing time from an end of the second DCI.

21. A user equipment (UE) for wireless communication, comprising:
a memory; and
one or more processors operatively coupled to the memory, the one or more processors configured to:
receive first downlink control information (DCI) and second DCI that together schedule a communication of the UE,
wherein the second DCI is received using a default beam when a time offset between receiving the first DCI and receiving the second DCI is less than a minimum scheduling offset, and
wherein the second DCI is received according to scheduling information in the first DCI when the time offset is greater than or equal to the minimum scheduling offset; and
transmit or receive the communication based at least in part on the first DCI and the second DCI.

22. The UE of claim 21, wherein the one or more processors, to receive the first DCI and the second DCI, are configured to:
receive the second DCI in a physical downlink shared channel.

23. The UE of claim 21, wherein the one or more processors, to receive the first DCI and the second DCI, are configured to:
receive the second DCI according to the minimum scheduling offset when the minimum scheduling offset is configured for the UE.

24. The UE of claim 21, wherein the one or more processors are configured to:
determine the default beam based at least in part on a quasi co-location assumption associated with a control resource set (CORESET).

25. The UE of claim 24, wherein the CORESET is associated with a lowest CORESET identifier of CORESETs associated with search spaces monitored by the UE.

26. The UE of claim 21, wherein the one or more processors are configured to:
determine that the second DCI is to be received after the minimum scheduling offset following reception of the first DCI.

27. The UE of claim 21, wherein the first DCI schedules the second DCI with a timing value that satisfies the minimum scheduling offset.

28. A base station for wireless communication, comprising:
a memory; and
one or more processors operatively coupled to the memory, the one or more processors configured to:
transmit first downlink control information (DCI) and second DCI that together schedule a communication of a user equipment (UE),
wherein the second DCI is transmitted using a default beam when a time offset between transmitting the first DCI and transmitting the second DCI is less than a minimum scheduling offset, and
wherein the second DCI is transmitted according to scheduling information in the first DCI when the time offset is greater than or equal to the minimum scheduling offset; and
transmit or receive the communication based at least in part on the first DCI and the second DCI.

29. The base station of claim 28, wherein the one or more processors, to transmit the first DCI and the second DCI, are configured to:
transmit the second DCI in a physical downlink shared channel.

30. The base station of claim 28, wherein the one or more processors, to transmit the first DCI and the second DCI, are configured to:

transmit the second DCI according to the minimum scheduling offset when the minimum scheduling offset is configured for the UE.

\* \* \* \* \*